United States Patent [19]

Steeby et al.

[11] Patent Number: 5,389,053
[45] Date of Patent: Feb. 14, 1995

[54] SYSTEM AND METHOD FOR SLIDING CLUTCH ENGAGEMENT UNDER TOOTH BUTT OR TORQUE LOCK CONDITIONS

[75] Inventors: Jon A. Steeby, Schoolcraft; Todd W. Fritz, Kalamazoo, both of Mich.

[73] Assignee: Eaton Corporation, Cleveland, Ohio

[21] Appl. No.: 95,279

[22] Filed: Jul. 21, 1993

[51] Int. Cl.$^6$ ............................................. B60K 20/02
[52] U.S. Cl. ...................................... 477/123; 74/335; 74/336 R; 477/124; 364/424.1
[58] Field of Search .................. 477/123, 124; 74/335, 74/336 R; 364/424.1

[56] References Cited

U.S. PATENT DOCUMENTS

| | | |
|---|---|---|
| 4,595,986 | 6/1986 | Daubenspeck et al. . |
| 4,614,126 | 9/1986 | Edelen et al. . |
| 4,784,019 | 11/1988 | Morscheck . |
| 4,860,861 | 8/1989 | Gooch et al. . |
| 4,899,607 | 2/1990 | Stainton . |
| 5,099,711 | 3/1992 | Langbo et al. . |
| 5,109,721 | 5/1992 | Boardman et al. ................ 74/336 R |
| 5,274,553 | 12/1993 | Boardman .......................... 364/424.1 |

Primary Examiner—Charles A. Marmor
Assistant Examiner—Peter Kwon
Attorney, Agent, or Firm—Brooks & Kushman

[57] ABSTRACT

A system and method are disclosed for controlling a shift event in a transmission wherein a shift actuator develops a force to effect the engagement of a clutch collar and a gear. The method comprises detecting when a non-fully engaged condition of the clutch collar and the gear occurs, indicating either a tooth butt or torque lock condition, and then pulsing the shift actuator, when the non-fully engaged condition is detected, between a relatively low force and a relatively high force to disturb the clutch collar and the gear out of the non-fully engaged condition. The detecting step comprises examining either the axial position of the clutch collar or the axial position of a shift rail operatively connected to the clutch collar with a rail position sensor. Preferably, a signal having a modulated pulse width and a frequency of between about 5 and 20 Hertz is sent to the shift actuator. The system which embodies this method is disclosed in the forms of an automated mechanical transmission having sliding clutch collars and a transmission system having a standard friction master clutch interposed the engine and the transmission.

21 Claims, 4 Drawing Sheets

… … …

SYSTEM AND METHOD FOR SLIDING CLUTCH ENGAGEMENT UNDER TOOTH BUTT OR TORQUE LOCK CONDITIONS

TECHNICAL FIELD

This invention relates to a system and method for controlling the operation of an automated mechanical transmission of a motor vehicle, and more particularly to such a system and method for sensing tooth butt and/or torque lock conditions and for taking action to overcome these conditions.

BACKGROUND ART

Automatic mechanical transmission systems comprising mechanical transmissions and controls and actuators to automatically shift same, usually electronically controlled in accordance with sensed inputs and predetermined logic rules, are known. Examples of such systems may be seen by reference to U.S. Pat. No. 4,648,290, U.S. Pat. No. 4,642,771, U.S. Pat. No. 4,595,986, U.S. Pat. No. 4,527,447, U.S. Pat. No. 4,361,060, U.S. Pat. No. 4,140,031 and U.S. Pat. No. 4,081,065, the disclosures of which are hereby incorporated by reference. Such systems may also be seen by reference to SAE Paper No. 831776 titled "AUTOMATED MECHANICAL TRANSMISSION CONTROLS," the disclosure of which is hereby incorporated by reference. Fault tolerance logic routines for automatic transmissions are known as may be seen by reference to U.S. Pat. No. 4,922,425, U.S. Pat. No. 4,849,899 and U.S. Pat. No. 4,899,279, the disclosures of which are hereby incorporated by reference.

Electronic and other engine fuel control systems wherein the fuel supplied to the engine may be modulated to provide a desired engine speed, regardless of the operator's setting of the throttle pedal, are known in the prior art. Such systems may be seen by reference to U.S. Pat. No. 4,081,065, U.S. Pat. No. 4,361,060, U.S. Pat. No. 4,792,901 and by reference to SAE J1922 and SAE J1936 electronic engine control standards, and related standards SAE J1708, J1587 and J1843, all of which are hereby incorporated by reference.

With automated transmission systems, particularly those derived from a manual nonsynchronized mechanical transmission, the conditions of tooth butting and/or tooth buzzing may occur, for instance when the vehicle starts from a stop. Tooth butting occurs when the ends of the teeth of the jaw clutch members come into abutment rather than axial interengagement, for instance when the rotational speeds of a sliding clutch and of a gear are equal or nearly equal when a gear engagement is initiated. Eventually the speeds of the two jaw clutch members will change and slip occurs causing a gear buzz (chatter) during the ensuing engagement. Tooth buzzing thus occurs when the ends of the butted jaw clutch teeth go into a grinding relative rotation rather than into axial interengagement as one of the clutch members is rotated to overcome butting. In such transmission systems, especially if the master friction clutch or torque disconnect clutch is not closely modulated, it is desirable to provide logic routines for detecting and for overcoming such tooth butt or tooth buzz conditions.

Furthermore, during a shift sequence of the gears of a transmission, it is possible to not fully engage the sliding clutch due to torque lock. Torque lock occurs when, due to torque being transmitted, a higher frictional force exists than the input force trying to slide the clutch into full engagement. During torque lock, a sudden torque decrease or reversal may allow the gear to fully engage, but until that occurs all of the power flow for the gear is through the partial engagement. Under normal torque lock conditions, the sliding clutch will not engage further until a torque reversal has occurred. The same phenomenon occurs during a gear butt condition.

A conventional method of recovery from tooth butting and tooth buzzing has been to continue pushing the clutch collar and gear toward engagement, or to recycle the gear box back to neutral and reinitiate engagement multiple times until complete, as disclosed by U.S. Pat. No. 5,099,711, assigned to the assignee of the present invention and hereby incorporated by reference.

SUMMARY OF THE INVENTION

The present invention is a system and method for controlling a shift event in a transmission wherein a shift actuator develops a force to effect the engagement of a clutch collar and a gear. The method comprises detecting when a non-fully engaged condition of the clutch collar and the gear occurs, indicating either a tooth butt or torque lock condition, and then pulsing the shift actuator, when the non-fully engaged condition is detected, between a relatively low force and a relatively high force to disturb the clutch collar and the gear out of the non-fully engaged condition. The detecting step comprises examining the axial position of either the clutch collar or a shift rail operatively connected to the clutch collar. Preferably, a signal is applied to the shift actuator having a modulated pulse width and a frequency of approximately 10 Hertz. The system which embodies this method is also disclosed in the form of an automated mechanical transmission having sliding clutches.

Accordingly, it is an object of the present invention to provide a new and improved system and method for detecting and overcoming a tooth butt and/or torque lock condition in the transmission of a motor vehicle.

This and other objects and advantages of the present invention will become apparent from a reading of the detailed description of the preferred embodiment in connection with the drawings.

DESCRIPTION OF THE PREFERRED EMBODIMENT

Figure 1:
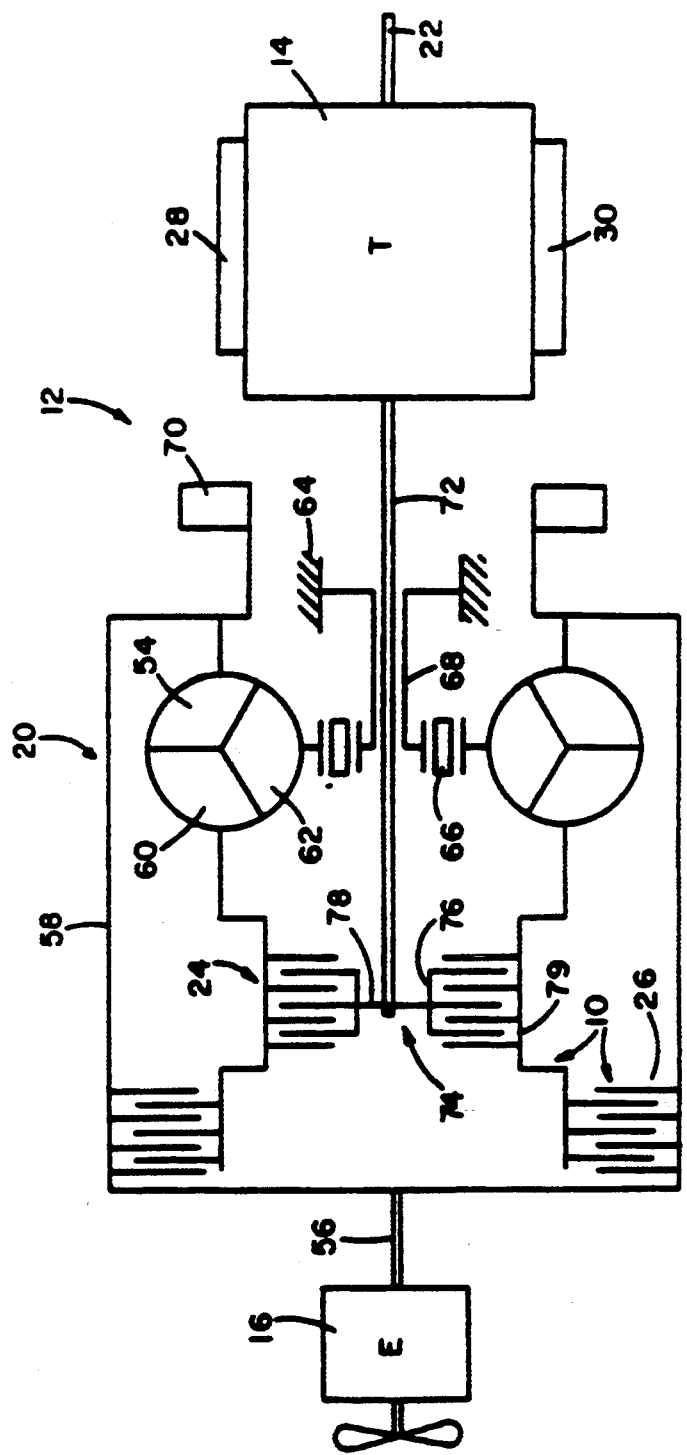
FIG. 1 is a schematic view of an automatic mechanical transmission of the present invention including a torque converter.
Figure 2:
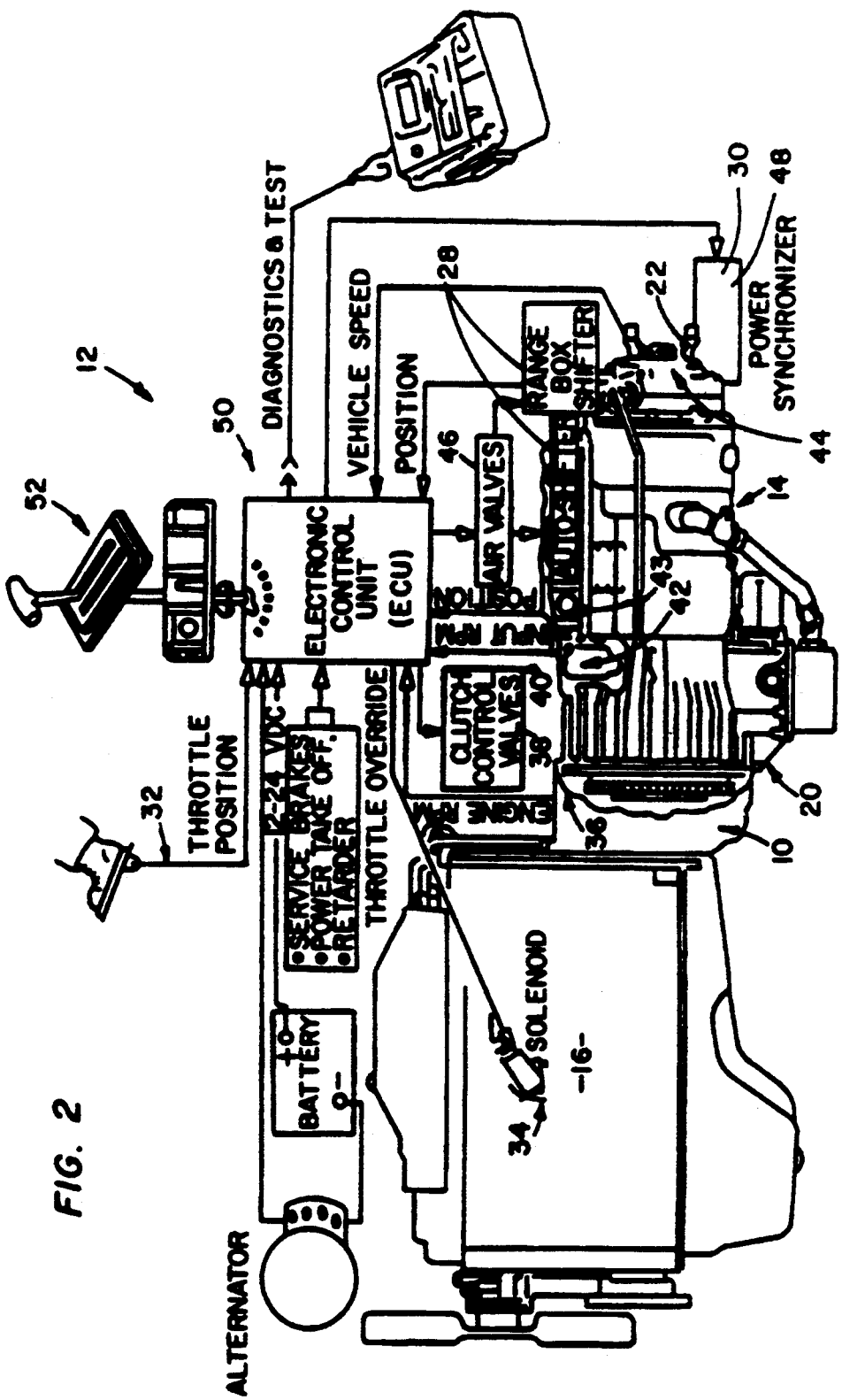
FIG. 2 is another schematic illustration of the automatic mechanical transmission.
Figure 3:
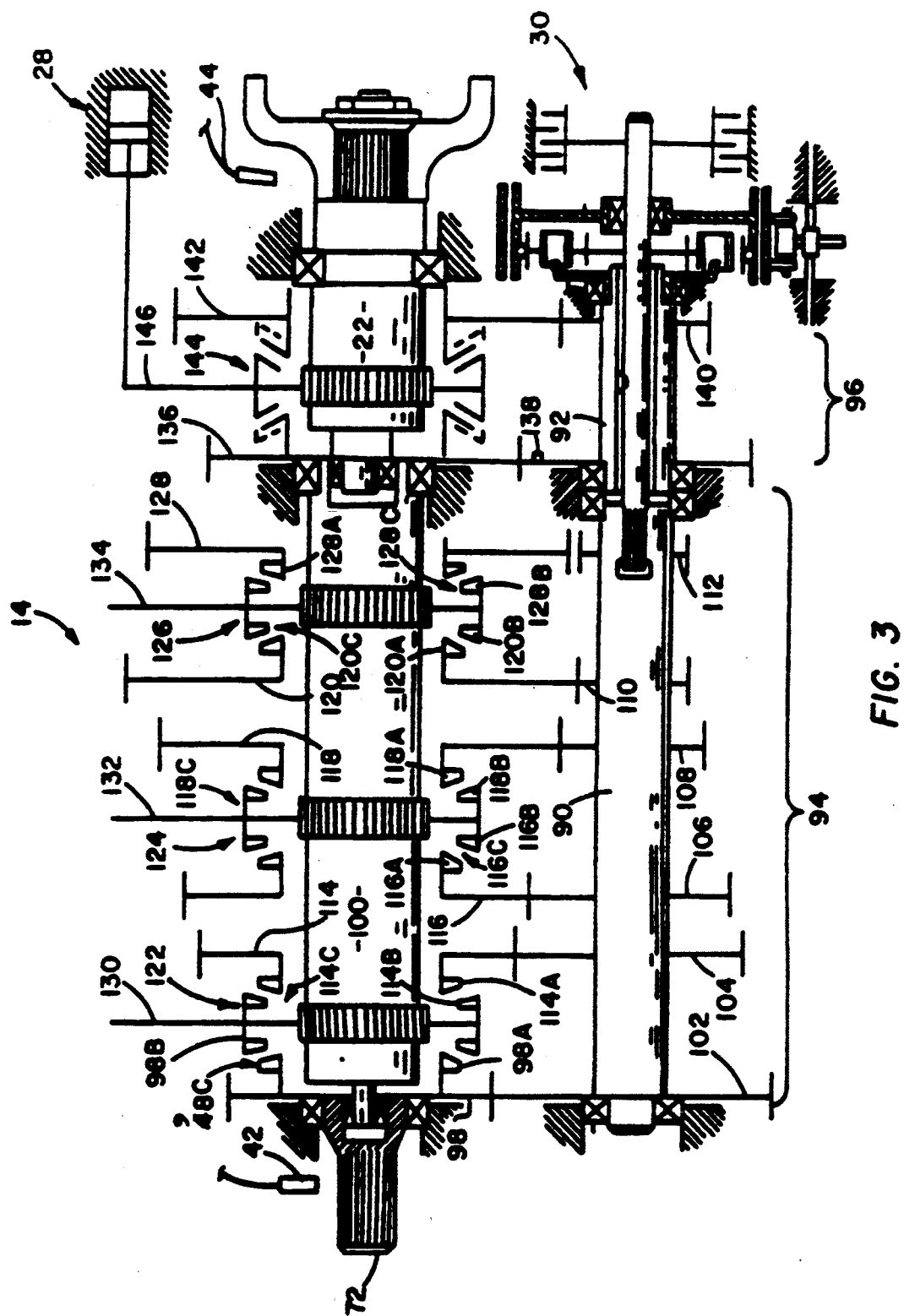
FIG. 3 is a partial view, in section, of the automatic mechanical transmission.

FIGS. 1, 2 and 3 schematically illustrate a torque converter lock-up and disconnect clutch assembly 10 and an automatic mechanical transmission system 12 utilizing same. The term "automatic mechanical transmission system" as used herein means a system comprising at least a throttle device controlled heat engine 16, a multi-speed jaw clutch type change gear transmission 14, a nonpositive coupling device such as a master friction clutch and/or a fluid coupling 10/20 interposed the engine and the transmission, and a control unit 50 for automatically controlling same. Such systems will, of course, also include sensors and/or actuators for sending input signals to and/or receiving command output signals from the control unit. While the present invention is suited for use in connection with transmission systems having a torque converter and torque converter lockup/disconnect clutch, the invention is also particularly applicable to transmission systems having a standard friction master clutch drivingly interposed the engine and the transmission.

The automatic mechanical transmission system 12 of the present invention is intended for use on a land vehicle, such as a heavy duty truck, but is not limited to such use. The automatic mechanical transmission system 12 illustrated includes an automatic multi-speed mechanical change gear transmission 14 driven by a prime mover throttle device controlled engine 16 (such as a diesel engine) through a fluid coupling or torque converter assembly 20. The output of the automatic transmission 14 is an output shaft 22 which is adapted for driving connection to an appropriate vehicle component such as the differential of a drive axle, a transfer case, or the like as is well known in the prior art.

As will be discussed in greater detail below, the torque converter lock-up and disconnect clutch assembly 10 includes two separate, independently engageable clutches, preferably friction clutches, a torque converter disconnect clutch 24 and a torque converter lock-up or bypass clutch 26. The transmission 14 includes a transmission operating mechanism 28 which is preferably in the form of a pressurized fluid actuated shifting assembly of the type disclosed in above-mentioned U.S. Pat. No. 4,445,393. The transmission also preferably includes a power synchronizer assembly 30 which may be of the type illustrated and disclosed in above-mentioned U.S. Pat. No. 3,478,851, U.S. Pat. No. 4,023,443 or U.S. Pat. No. 4,614,126. The present invention is also applicable to automated mechanical transmission systems not including a power synchronizer assembly.

The above-mentioned power train components are acted upon and monitored by several devices, each of which are known in the prior art and will be discussed in greater detail below. These devices may include a throttle position monitor assembly 32 which senses the position of the operator controlled vehicle throttle pedal or other fuel throttling device, a throttle control 34 which controls the supply of fuel to the engine, an engine speed sensor assembly 36 which senses the rotational speed of the engine, a torque converter disconnect clutch and lock-up clutch operator 40 which operates the torque converter disconnect and lock-up clutches, a transmission input shaft speed sensor 42, a transmission output shaft speed sensor 44, a transmission shifting mechanism operator 46 for controlling the operation of transmission shifting mechanism 28 and/or a power synchronizer mechanism actuator 48 for controlling the operation of power synchronizer mechanism 30. The throttle control 34 may simply be an override device to reduce ("dip") fuel to the engine to a set or variable level regardless of the operator's positioning of the throttle pedal. Alternatively, the throttle control may be a portion of an electronic engine control complying with the above-mentioned SAE J1922, SAE J1939 or a similar standard.

The above-mentioned devices supply information to and/or accept commands from an electronic central processing unit (ECU) 50. The central processing unit or controller 50 is preferably based on a digital microprocessor, the specific configuration and structure of which form no part of the present invention. The central processing unit 50 also receives information from a shift control or mode selector assembly 52 by which the operator may select a reverse (R), a neutral (N), or several forward drive (D, $D_L$) modes of operation of the vehicle. Typically, the D mode of operation is for on-highway vehicle travel while the $D_L$ mode of operation is for off-road operation.

The system also typically includes various sensors, circuits, and/or logic routines for sensing and reacting to sensor and/or actuator failures. As is known, the central processing unit 50 receives inputs from the various sensors and/or operating devices. In addition to these direct inputs, the central processing unit 50 may be provided with circuitry and/or logic for differentiating the input signals to provide calculated signals indicative of the rate of change of the various monitored devices, means to compare the input signals, and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. Nos. 4,361,060 and 4,595,986 and/or by reference to a technical paper entitled "THE AUTOMATION OF MECHANICAL TRANSMISSIONS" published proceedings of a joint IEEE/SAE conference entitled International Congress 20 on Transportation Electronics, IEEE Catalog Number 84CH1988-5, the disclosure of which is hereby incorporated by reference. As is well known in the operation/function of electronic control units, especially microprocessor based ECUs, the various logic functions can be performed by discrete hardwired logic units or by a single logic unit operating under different portions or subroutines of the control system logic rules (i.e. the software).

FIG. 1 shows a more detailed schematic illustration of the torque converter 20 and torque converter lock-up and disconnect or interrupt clutch assembly 10 drivingly interposed engine 16 and automatic change gear transmission 14. The torque converter assembly 20 is conventional in that it includes a fluid coupling of the torque converter type having an impeller 54 driven by the engine output or crankshaft 56 through a shroud 58, a turbine 60 hydraulically driven by the impeller and a stator or runner 62 which becomes grounded to a housing 64 via a one-way roller clutch 66 carried by a shaft 68 grounded to the housing 64. Shroud 58 also drives a pump 70 for pressurizing the torque converter, lubricating the transmission, selectively pressuring the transmission shifting mechanism 28, and/or power synchronizing mechanism 30 and/or operating the disconnect and bypass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking up the torque converter 20 and driving transmission 14 directly from the engine 16 if disconnect clutch 24 is engaged. Additionally, at speeds above torque converter lock-up speed, the lock-up clutch 26 need not be engaged and disengaged during shifting as disengagement of clutch 24 disconnects the inertia of connection member 79 from input shaft 72.

If the torque converter bypass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial affects of the engine, clutch 26 and/or torque converter allows the rotational speed of the input shaft 72, and all transmission gearing drivingly connected thereto, to be accelerated or decelerated by the transmission power synchronizer mechanism 30 in a more rapid manner for purposes of more rapidly achieving synchronization during a downshift or upshift of the transmission and also allows the power synchronizer 30 to cause the input shaft 72 to rotate at a rotational speed greater than any governed engine speed.

When the vehicle is at rest with the mode selector in the drive or off-highway drive mode, the disconnect clutch 24 will be engaged and the lock-up clutch 26 disengaged allowing for torque converter start-up with its well known advantages. At above a given vehicle speed and/or gear ratio, the advantages of torque converter operation are no longer required, and the increased efficiency of a direct drive between the drive engine and transmission is required. Upon these conditions, the torque converter lock-up clutch 26 will be maintained engaged allowing the transmission input shaft 72 to be driven directly from the engine via the torque converter shroud 58 and connecting member 79 when the disconnect clutch 24 is engaged.

As discussed above, clutch 24 will be disengaged to shift from a previously engaged gear to neutral, to allow the power synchronizer 30 to synchronize the jaw clutch members of the gear to be engaged and to allow engagement of the synchronized jaw clutches of the gear to be engaged. Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. No. 4,361,060 and U.S. Pat. No. 4,595,986.

FIG. 3 illustrates the compound transmission 14 wherein the main section countershaft or countershafts 90 are coaxially aligned with the auxiliary section countershaft or countershafts 92. Transmission 14 is of a relatively standard design and is preferably of the twin countershaft type only one of which countershafts in the main and auxiliary sections 94 and 96, respectively, is shown. Examples of such transmissions having coaxially aligned main section and auxiliary section countershafts may be seen by reference to U.S. Pat. No. 3,105,395 and U.S. Pat. No. 3,138,965, the disclosures of which are incorporated by reference.

Transmission 14 includes input shaft 72 to which member 78 is fixed for rotation therewith and which additionally carries input gear 98 nonrotatably attached thereto. Main section countershaft 90 is substantially parallel to mainshaft 100 and is provided with countershaft gears 102, 104, 106, 108, 110 and 112 fixed for rotation therewith. A plurality of mainshaft or ratio gears 114, 116, 118, and 120 surround the mainshaft 100 and are selectively clutchable, one at a time, to the mainshaft for rotation therewith by sliding double sided positive jaw clutch collars 122, 124 and 126. Jaw clutch collar 122 may also clutch input gear 98 to mainshaft 100 to provide a direct drive relationship between input shaft 72 and the mainshaft, while clutch collar 126 may clutch reverse mainshaft gear 128 to the mainshaft.

The mainshaft gears 114, 116, 118 and 120 encircle the mainshaft and are in continuous meshing engagement with, and are preferably supported by, opposed pairs of countershaft gears 104, 106, 108 and 110 which mounting means and the special advantages resulting therefrom are explained in greater detail in U.S. Pat. No. 3,105,395 and U.S. Pat. No. 3,335,616. Reverse mainshaft gear 128 is in continuous meshing engagement with countershaft gear 112 by means of conventional intermediate idler gears (not shown). The forwardmost countershaft gear 102 is continuously meshed with and driven by input gear 98 for causing rotation of countershaft 90 whenever the input gear is rotatably driven.

Clutch collar 122 carries positive jaw clutch teeth 98b and 114b which are engageable with clutch teeth 98a and 114a, respectively, to define positive jaw clutches 98c and 114c, respectively. Clutch collar 124 carries positive jaw clutch teeth 116b and 118b which are engageable with jaw clutch teeth 116a and 118a, respectively, to define positive jaw clutches 116c and 118c, respectively. Jaw clutch collar 126 carries jaw clutch teeth 120b and 128b which are positively engageable with jaw clutch teeth 120a and 128a, respectively, to define positive jaw clutches 120c and 128c, respectively.

Each of the clutch collars are preferably directly or indirectly splined to the mainshaft for rotation therewith and axial movement relative thereto. Other mounting means for the clutch collars are known in the prior art and are intended to be included within the scope of the present invention. Each of the clutch collars 122, 124 and 126 is provided with means for receiving a shift fork or shift yoke 130, 132 and 134, respectively, whereby the clutch collars are axially moved, one at a time only, from the positions illustrated in FIG. 3 by the actuator 28.

A position sensor assembly 43 provides signals indicative of the axial positioning of the shift yokes or of the shift rails associated therewith. Typically, these signals are indicative of neutral-not neutral and/or of engaged-not engaged positions of the shift yokes and the jaw clutch members associated therewith.

The auxiliary transmission section 96 includes output shaft 22 which is preferably coaxial with input shaft 72 and mainshaft 100 and is supported for rotation in a transmission housing by means of bearings. The auxiliary section also includes an auxiliary section countershaft 92 supported for rotation in the housing by means of bearings. Fixed for rotation with mainshaft 100 is the auxiliary section drive gear 136. Auxiliary section countershaft 92 carries auxiliary section countershaft gears 138 and 140 fixed for rotation therewith. Auxiliary section countershaft gear 138 is constantly meshed with auxiliary section input gear 136, while auxiliary section countershaft gear 140 is constantly meshed with output gear 142 which surrounds the output shaft 22. A synchronized clutch structure 144, of conventional individually synchronized jaw clutch design, is utilized to selectively clutch mainshaft 100 and auxiliary drive gear 136 directly to the output shaft 22 for a direct drive connection between the mainshaft and output shaft or to clutch output gear 142 to the output shaft 22 for a reduction drive of output shaft 22 from mainshaft 100 through countershaft 92 as is well known in the prior art. Synchronized clutch structure 144 is controlled by shift fork 146 axially moved by actuator 28.

Transmission 14 is of the range type wherein the auxiliary section ratio step (or steps) is greater than the total ratio coverage of the main section ratios appearing in all ranges. Such transmissions are well known in the prior art, as described in U.S. Pat. No. 4,754,665, the disclosure of which is hereby incorporated by reference.

The power synchronizer assembly 30 includes a planetary speed increasing gear set driven by the output shaft 22 independently of the rotational speed of the drive engine 16, and is selectively actuable to accelerate the rotational speed of transmission elements driven by the input shaft 72 for purposes of synchronous rotation of jaw clutch members associated with the gear ratio to be engaged. Preferably, the power synchronizer assembly 30 will also include means to decelerate the transmission elements driven by the input shaft. Deceleration of the transmission elements driven by the input shaft may also be achieved by input shaft and/or engine braking devices which will preferably be controlled by central processing unit 50.

The power synchronizer assembly 30 is driven by the vehicle through gear 142 which is driven directly or indirectly by output shaft 22 and thus the power synchronizer is not effective to accelerate the main section countershaft 90 when the auxiliary section is not engaged. Details of construction and operation of the power synchronizer assembly 30 may be appreciated in greater detail by reference to above-mentioned U.S. Pat. No. 4,614,126.

For a simple shift of transmission 14, such as when the ECU 50 determines that a shift from second (2nd) to third (3rd) speed is required (i.e. a simple upshift), the ECU will cause fuel controller 34 to defuel (i.e. "dip") the engine regardless of the position of the throttle pedal 32. While the engine is being defueled, the disconnect clutch (or master clutch) 24 is disengaged and shift to main section 94 neutral is undertaken. Upon defueling the engine, declutching the disconnect clutch and disengaging the main section, the power synchronizer is actuated to cause the mainshaft gearing (in this example 3rd speed mainshaft gear 116) to rotate at a target or substantially synchronous speed relative to mainshaft 100 as determined by output shaft speed and auxiliary section 96 ratio. Output shaft speed is sensed by sensor 44 while the speed of the various mainshaft gears is a known multiple of input shaft 72 speed as sensed by sensor 42. In transmission systems having a standard-manually controlled friction master clutch drivingly interposed the engine and the transmission, the master clutch is not automatically disengaged, and in fact the present invention allows the master clutch to remain engaged during the shift event. One advantage of this is that the vehicle operator can manipulate input shaft speed to facilitate the achievement of synchronous.

In the automated transmission system, the rail select function can occur at any time after main section disengagement and main section reengagement in the new ratio is timed to occur as the power synchronizer is bringing the engaged gear toward target speed. Of course, for an upshift in an automated transmission the power synchronizer is normally required to retard the speed of the input shaft and associated gearing. Upon achieving engagement of the proper main section ratio, the disconnect clutch is reengaged and the engine refueled. Typically, a simple shift can be accomplished in about 0.70 to 0.80 seconds with a disconnect (i.e. torque break) time of about 0.50 seconds.

The main section 94 of transmission 14 of automated system 12, being derived from a manual nonsynchronized transmission, may butt jaw clutch teeth when attempting to engage a main section gear from neutral. This is a common occurrence with nonsynchronized transmissions, and conventionally required the operator to partially engage the transmission master clutch to gently slip the butted clutch teeth off of the butting condition to achieve engagement.

While tooth butting is not exclusively a problem associated with nonsynchronized transmissions, the use of relatively blunt or bullet nosed clutch teeth in nonsynchronized transmissions, compared with the relatively pointed nose teeth typically used on synchronized transmissions, makes tooth butting much more of a problem in nonsynchronized transmissions. In shifting automated transmission 14, as with almost all nonsynchronized manual transmissions, the selection of a drive or reverse gear during a shift event can result in a tooth butting or a torque lock condition, for example when the vehicle is stopped and the initial gear is engaged from neutral.

Figure 4:
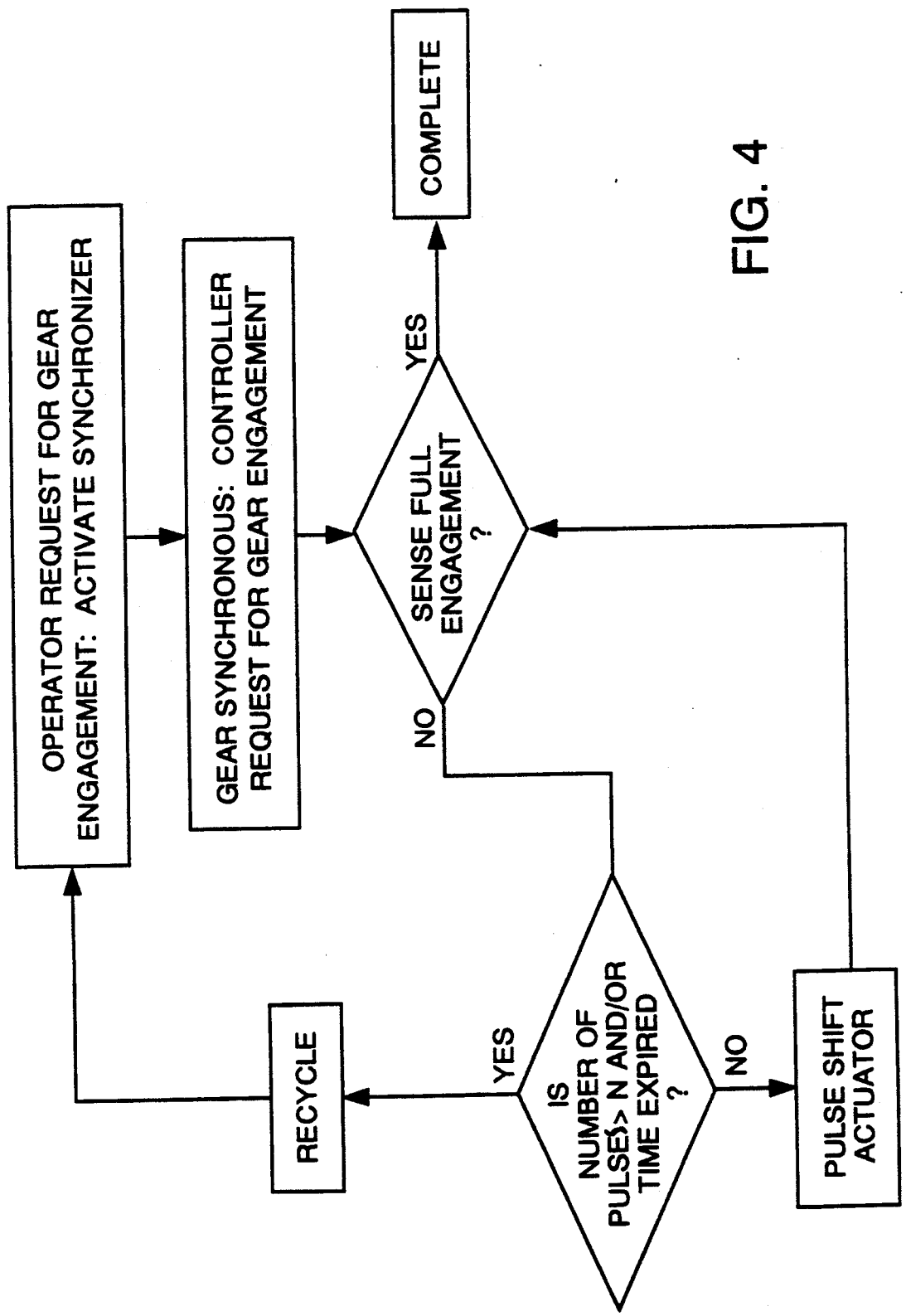
FIG. 4 is a transition diagram of the control system/method logic of the present invention.

FIG. 4 shows the transmission control system/method of the present invention, as implemented by ECU 50. The transmission control system/method is able to detect the tooth butting or the torque lock condition during the shift event, and to take action to slip the gear into an engaged position. As part of the engagement shift sequence (request for gear engagement), the control system/method first synchronizes the input shaft to the target gear speed, then requests gear engagement. If after a period of time, for example about 0.5 seconds or less, the control system senses that the shift actuator or the sliding clutch has successfully moved from neutral but failed to achieve full engagement, the system briefly requests engagement of the disconnect clutch 24, preferably for about 0.5 seconds. If after about 1 second the control system continues to detect either a non-engaged condition (indicating tooth butt) or a partially engaged condition (indicating torque lock), then a signal is sent to cause the shift actuator or other engagement motor to rapidly modulate or pulse between a relatively low force and a relatively high force to disturb or drive the sliding clutch into full engagement with the gear. Preferably, the actuator modulates the force between about −20 and 150 pounds. The negative application of force does not move the sliding clutch collar, but merely relaxs the XY shifter and the shift bar housing to relieve any static friction in the mechanical linkage. The shift actuator thus does not reverse direction to perform this function, but instead continually forces the sliding clutch collar toward an engaged position. The frequency of the signal sent to the shift actuator may be varied between about 5 and 20 Hertz depending on desired resolution, and is preferably approximately 10 Hertz. The pulse width of the signal is also preferably modulated. In an automated transmission, the interrupt clutch can be briefly engaged during this operation for a longer period of time, preferably about 1 second. In a transmission having a manual master clutch, the master clutch can remain engaged during this operation.

In the case of a torque lock condition, pulsing of the shift actuator allows a springing into gear as torque reversals occur. In the case of a butt condition, the pulses cause the clutches to slip quickly and engage before the rotational speeds of the jaw clutch members are out of synchronous.

The control system continuously monitors for engagement. If axial jaw clutch engagement is ever detected during this sequence, then the disconnect clutch of the automated transmission system is engaged and the shift sequence is complete. If axial jaw clutch engagement is not detected after a certain longer period of time and/or a certain number N of pulses of the actuator in either the automated or non-automated transmission system, then neutral is requested and the cycle repeats from the beginning of the initial engagement shift sequence.

The input shaft and output shaft speed sensors 42 and 44, respectively, are used to sense the rotational speed of engaging jaw clutch members. The rail position sensors 43, which may for example be potentiometers, are used for sensing neutral/not neutral and engaged/not engaged (including partial engagement) axial movement of the movable jaw clutch members 98b, 114b, 118, 120b or 128b. If, for a predetermined period of time upon an attempted engagement, the engaging jaw clutch is at a not neutral and not engaged condition, while the jaw clutches are rotating at a substantially synchronous speed, this indicates jaw clutch butting. If the rail position sensor continues to indicate a not engaged condition while the speed sensors indicate continued synchronous rotation of the clutch members, the shift actuator modulation routine of the present invention is invoked. If a given number of pulses of the shift actuator are unsuccessful to effect full engagement and/or a certain period of time passes, then the entire gear engagement process is restarted.

Accordingly, a transmission system of either a) the type having a standard manually operated master clutch, or b) an automated mechanical transmission type based upon a normally manually shifted nonsynchronized transmission 14, is provided which has a control system/method including logic for detecting jaw clutch butting and/or torque lock conditions and for taking action to overcome same. Because the shift actuator is not returned to neutral on a recycle when a tooth butt or torque lock condition is initially experienced, the resulting shift is faster and missed shifts are reduced. Gear buzzing is also dissipated in the actuator and stress on the components is reduced.

It should be understood that the above description of the preferred embodiment is by way of example only and that various modifications, substitutions and/or rearrangements of the parts are possible without departing from the spirit and the scope of the present invention as hereinafter claimed.

What is claimed is:

1. A method for controlling a shift event in a transmission wherein a shift actuator develops a force to effect the engagement of a clutch collar and a gear, the method comprising:
    detecting when a non-fully engaged condition of the clutch collar and the gear occurs; and
    pulsing the shift actuator, when the non-fully engaged condition is detected, between a relatively low force and a relatively high force to disturb the clutch collar and the gear out of the non-fully engaged condition.

2. The method of claim 1 wherein the clutch collar is axially slidable along a shaft.

3. The method of claim 2 wherein the detecting step comprises examining the axial position of the clutch collar.

4. The method of claim 2 wherein the detecting step is performed by a rail position sensor.

5. The method of claim 4 wherein the rail position sensor comprises a potentiometer.

6. The method of claim 1 wherein the pulsing step comprises applying a signal to pulse the shift actuator.

7. The method of claim 6 wherein the signal has a modulated pulse width.

8. The method of claim 6 wherein the signal has a frequency of between about 5 and 20 Hertz.

9. The method of claim 1 wherein the non-fully engaged condition corresponds to a tooth butt condition.

10. The method of claim 1 wherein the non-fully engaged position corresponds to a torque lock condition.

11. The method of claim 1 wherein the detecting step comprises sensing the rotational speed and relative axial positions of the clutch collar and the gear, and if, after a period of time, the clutch collar and the gear continue to rotate at a substantially synchronous speed and move into an axial position indicative of nonengagement, determining that a tooth butt condition exists.

12. The method of claim 1 wherein the detecting step comprises sensing the rotational speed and relative axial positions of the clutch collar and the gear, and if, after a period of time, the clutch collar and the gear continue to rotate at a substantially synchronous speed and move into an axial position indicative of partial engagement, determining that a torque lock condition exists.

13. The method of claim 1 further comprising synchronizing the rotational speeds of the clutch collar and the gear prior to engagement.

14. The method of claim 1 wherein the transmission includes a friction master clutch.

15. The method of claim 1 wherein the transmission is an automated mechanical transmission.

16. The method of claim 1 wherein the clutch collar is synchronized.

17. The method of claim 1 wherein the clutch collar is not synchronized.

18. A transmission comprising:
a shaft having a plurality of gears rotatably supported thereon;
a plurality of clutch collars axially slidable along the shaft for rotatably connecting the gears to the shaft;
a shift actuator for developing a force to effect the engagement of one of the clutch collars and one of the gears;
means for detecting when a non-fully engaged condition of the clutch collar and the gear occurs; and
means for pulsing, when the non-fully engaged condition is detected, the shift actuator between a relatively low force and a relatively high force to disturb the clutch collar and the gear out of the non-fully engaged condition.

19. The transmission of claim 18 wherein the means for detecting comprises a rail position sensor which examines the axial position of the clutch collar.

20. The transmission of claim 18 wherein a signal having a modulated pulse width is sent to the shift actuator.

21. The transmission of claim 18 wherein a signal having a frequency of between about 5 and 20 Hertz is sent to the shift actuator.

* * * * *